United States Patent
Egli et al.

[15] 3,691,848
[45] Sept. 19, 1972

[54] FLUID ROTARY SPEED SENSOR

[72] Inventors: Werner H. Egli, Minneapolis; Donald J. Erickson, New Brighton, both of Minn.

[73] Assignee: The United States of America as represented by the Secretary of the United States Air Force

[22] Filed: July 10, 1970

[21] Appl. No.: 53,729

[52] U.S. Cl. ..................................73/502, 73/521
[51] Int. Cl. .............................................G01p 3/28
[58] Field of Search ...........415/90; 75/521, 523, 502

[56] References Cited

UNITED STATES PATENTS

| | | | |
|---|---|---|---|
| 2,258,770 | 10/1941 | Kleinman | 73/502 X |
| 3,037,457 | 6/1962 | Sternlicht | 415/90 |
| 1,975,965 | 10/1934 | Meyer | 415/90 |
| 2,969,020 | 1/1961 | Fazekas | 415/90 |

FOREIGN PATENTS OR APPLICATIONS

| 1,266,031 | 4/1968 | Germany | 73/521 |
|---|---|---|---|

*Primary Examiner*—James J. Gill
*Attorney*—Harry A. Herbert, Jr. and Jacob N. Erlich

[57] ABSTRACT

A fluid rotary speed sensor having a concave cylindrical surface placed in close proximity to a rotating shaft and with a slight eccentricity so that the clearance between the shaft and the concave cylindrical surface varies as a function of circumferential angle. Hydrodynamic pumping causes a differential pressure between two suitably located taps in the concave surface. This differential pressure is proportional to the shaft speed.

1 Claim, 1 Drawing Figure

PATENTED SEP 19 1972　　3,691,848
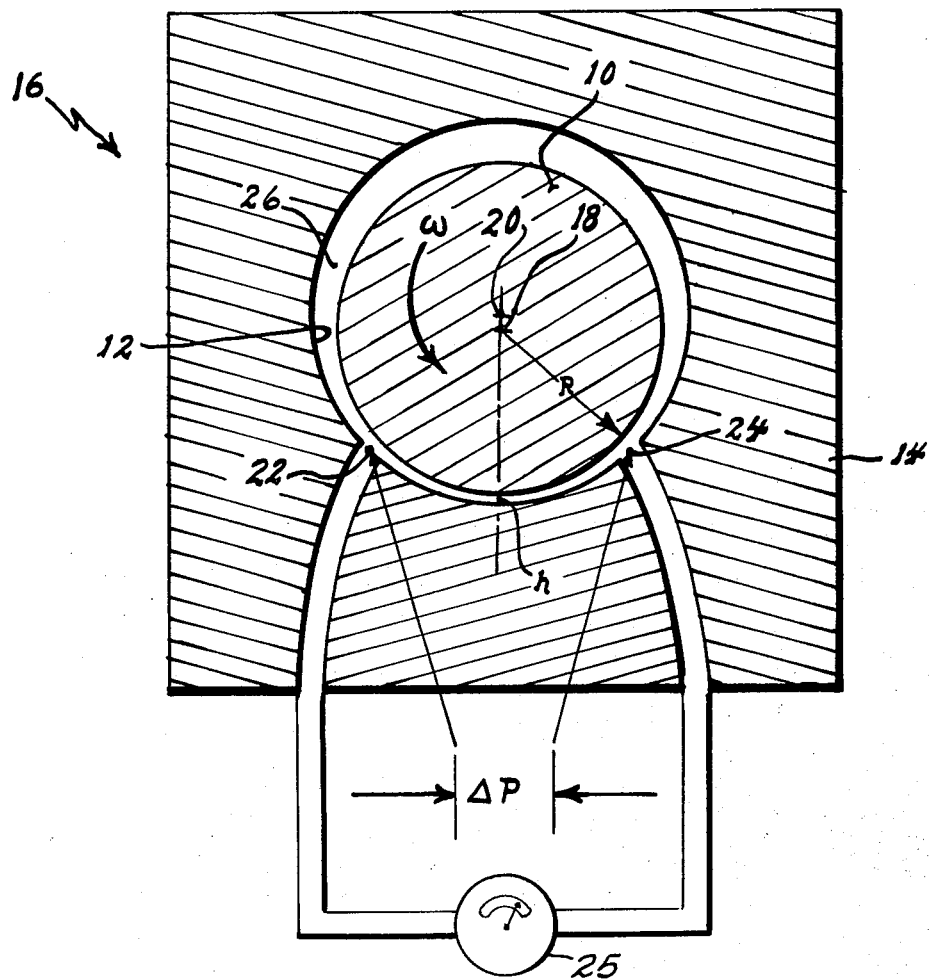
INVENTORS
WERNER H. EGLI,
DONALD J. ERICKSON
BY Harry A. Herbert Jr
Jacob N. Erlich and
ATTORNEYS

FLUID ROTARY SPEED SENSOR

BACKGROUND OF THE INVENTION

This invention is an improvement over the Pure Fluid Sensor disclosed in U.S. Pat. No. 3,363,453 issued Jan. 16, 1968 to one of the inventors of this application.

This invention relates generally to speed measuring devices, and more particularly to a device which determines the speed of a rotating shaft by the utilization of fluid pressure differential.

There are many instruments that measure angular speed, that is the speed of a rotating shaft. The measurement may be made in revolutions over an independently measured time interval, as in a revolution counter, or it may be made directly in revolutions per minute. These instruments may also indicate average speed over a time interval or instantaneous speed.

Heretofore, instruments for the measurement of the angular velocity of a rotating shaft were either extremely complex and expensive as in the case of the electrical instruments or extremely simple in operation and inaccurate as in the case of mechanical devices. It was therefore necessary to device an instrument which is not only simple in construction and operation but also extremely accurate and which requires very little maintenance.

SUMMARY OF THE INVENTION

The instant invention sets forth a speed sensor which overcomes the problems set forth hereinabove.

It has been found that the pressure change in a fluid immediately adjacent a rotating member is proportional to the angular velocity of the member. This invention sets forth a fluid speed sensor which is made up of a circular cylindrical body or shaft which is designed to rotate with a slight eccentricity within a concave cylindrical surface or outer member. As the shaft rotates, hydrodynamic pumping occurs within a fluid located between the shaft and the outer member. This pumping results in a pressure differential between two points on the concave surface of the outer member at which are located pressure pickoff taps for sensing the pressure differential. The speed determination is made in the instant invention by relating this differential pressure to the viscosity of the fluid contained between the shaft and the outer member, the radius of the shaft, and the minimum clearance between the rotating member or shaft and the outer member.

It is therefore an object of this invention to provide a fluid speed sensor for simply and accurately determining the speed of a rotating member.

It is another object of this invention to provide a fluid speed sensor which is easy to maintain.

It is a further object of this invention to provide a fluid speed sensor which is economical to produce and which utilizes conventional currently available materials that lend themselves to standard mass producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWING

The only FIGURE of the drawing is a side elevational view, shown in cross-section, of the fluid rotary speed sensor of this invention.

DESCRIPTION OF THE PREFERRED EMBODIMENT

Referring to the only FIGURE of the drawing, a circular cylindrical body or shaft 10 is mounted within a concave circular surface 12 of outer member 14 making up the fluid rotary speed sensor 16 of this invention. The outer diameter of shaft 10 is less than the inner diameter of circular surface 12 and the shaft 10 is mounted within this concave cylindrical surface 12 with a slight eccentricity so that the minimum clearance h between shaft 10 and surface 12 is located between a pair of conventional pressure pickoff taps 22 and 24. In other words, the center of rotation 18 of shaft 10 is displaced slightly from the center 20 of concave cylindrical surface 12. The pair of pressure pickoff taps 22 and 24 are located at two points along the concave cylindrical surface 12. A fluid 26 is located between shaft 10 and the outer member 14. Shaft 10 is rotated by any conventional motive means (not shown). The velocity imparted to the fluid 26 by shaft 10 varies from point to point in the fluid, as dictated by the differential equations of fluid mechanics, and consistent with the boundary conditions that the fluid immediately adjacent to the rotating shaft 10 moves with the shaft, while the fluid immediately adjacent to the outer member 14 is stationary. This variance in velocity establishes a pressure differential ($\Delta P$) between pickoff taps 22 and 24.

The angular velocity or speed of the rotating shaft 10 is determined by the following formula:

$$\omega = (K)(\Delta P h^2)/(\mu R^2;$$

that is $$\omega \alpha (\Delta P h^2)/(\mu R^2)$$

wherein $\omega$ is the angular velocity of the rotating shaft 10; $R$ is the shaft radius; $\mu$ is the viscosity of the fluid 26; $h$ is the minimum clearance between the shaft 10 and the concave cylindrical surface 12, and $K$ is a dimensionless coefficient which is a function of various dimensionless parameters, such as eccentricity, angular location of taps 22 and 24, etc. It is clearly evident that as the shaft 10 is rotated by any conventional motive means the differential pressure between pickoff points 22 and 24 can be easily ascertained by any conventional pressure sensing means 25. The radius of the rotating shaft 10 and the minimum clearance h can be determined by a measurement. The viscosity of the fluid 26 is also easily ascertainable in any set of conventional viscosity tables. The instant invention has therefore set forth a device which is not only simple in construction and operation but also accurate in the determination of the angular velocity of a rotating member such as shaft 10. Furthermore, for optimum results, the minimum clearance h should be located midway between pickoff taps 22 and 24.

Errors in speed measurement can occur with changes in ambient temperature because of viscosity changes. Compensation can be accomplished over moderate temperature ranges by selecting materials having thermal expansion coefficients which would change the clearance value $h$ just enough to offset the viscosity change.

Although this invention has been described with reference to a particular embodiment, it will be understood to those skilled in the art that the invention is also capable of a variety of alternate embodiments within the spirit and scope of the appended claims.

We claim:

1. A fluid rotary speed sensor comprising a circular cylindrical shaft, an outer member having a concave circular surface surrounding said cylindrical shaft, the center of rotation of said shaft being slightly displaced from the center of said circular surface, a fluid interposed between said shaft and said outer member, a pair of pressure pickoff taps located at two points along said circular surface equidistant from the center thereof, means connected to said pickoff taps responsive to the difference in pressure between said pair of pickoff taps, the minimum clearance between said shaft and said circular surface being a distance $h$ located midway between said pair of pickoff taps, and said shaft having a radius $R$, whereby upon rotation of said shaft the angular velocity of said shaft is proportional to $(\Delta P h^2)/(\mu R^2)$ where $\Delta P$ is the pressure differential between said pair of pressure taps and $\mu$ is the viscosity of said fluid.

* * * * *